United States Patent
Long

(10) Patent No.: US 11,612,159 B2
(45) Date of Patent: Mar. 28, 2023

(54) MULTI-BREAKAWAY BOOM FOR AGRICULTURAL MACHINE

(71) Applicant: Exel Industries, Epernay (FR)

(72) Inventor: Greg Long, Clay City, IN (US)

(73) Assignee: Exel Industries, Epernay (FR)

( * ) Notice: Subject to any disclaimer, the term of this patent is extended or adjusted under 35 U.S.C. 154(b) by 141 days.

(21) Appl. No.: 17/028,970

(22) Filed: Sep. 22, 2020

(65) Prior Publication Data

US 2022/0087244 A1 Mar. 24, 2022

(51) Int. Cl.
| | | |
|---|---|---|
| A01M 7/00 | (2006.01) | |
| B05B 15/14 | (2018.01) | |
| B05B 1/20 | (2006.01) | |

(52) U.S. Cl.
CPC ........ *A01M 7/0078* (2013.01); *A01M 7/0075* (2013.01); *B05B 1/20* (2013.01); *B05B 15/14* (2018.02)

(58) Field of Classification Search
CPC ... A01M 7/0078; A01M 7/0075; B05B 15/14; B05B 1/20
USPC ........ 239/159, 161, 163, 165–169, 172, 175
See application file for complete search history.

(56) References Cited

U.S. PATENT DOCUMENTS

| | | |
|---|---|---|
| 6,837,446 B1 | 1/2005 | Jesse |
| 7,669,784 B2 | 3/2010 | Sobolik |
| 8,864,048 B1 * | 10/2014 | Light .................. B05B 3/12 239/161 |
| 9,155,295 B2 | 10/2015 | Bouten |
| 9,462,799 B2 | 10/2016 | Bouten |
| 9,807,997 B2 | 11/2017 | Hiddema et al. |
| 10,258,028 B2 | 4/2019 | Pilney |
| 10,433,535 B2 | 10/2019 | Hiddema et al. |
| 10,440,942 B2 | 10/2019 | Barker et al. |
| 2007/0131791 A1 * | 6/2007 | Peterson ............. A01M 7/0078 239/166 |
| 2012/0273591 A1 * | 11/2012 | Honermann ........ A01M 7/0053 239/159 |

(Continued)

OTHER PUBLICATIONS

Agromaster F2000, image retrieved from internet, published at least as early as Feb. 21, 2020 (1 page).

(Continued)

*Primary Examiner* — Steven J Ganey
(74) *Attorney, Agent, or Firm* — Maginot, Moore & Beck, LLP

(57) ABSTRACT

A boom for an agricultural machine includes a first, second and third boom sections. The first boom section is connectable to a vehicle, and can support fluid delivery components. The second boom section operably connected to and is foldable with respect to the first boom section about a fold axis. The second boom section is further coupled to move with respect to the first boom other than about the fold axis from an extended position in response to an external force, and to return to the first extended position upon removal of the external force. The third boom section is operably connected to the second boom and having at least in an extended position. The third boom section is operably connected to move with respect to the second boom in response to a second external force, and operably connected to return to the extended position upon removal of the second external force.

20 Claims, 10 Drawing Sheets

(56) References Cited

U.S. PATENT DOCUMENTS

2016/0038961 A1* 2/2016 Carlson .............. A01M 7/0075
 239/168
2016/0374328 A1* 12/2016 Beggs ................ A01M 7/0053
 239/161

OTHER PUBLICATIONS

Apache Model AS1240 XP Sprayer, Specification Sheet, 2019 (2 pages).
Shafer Sentry 5000, image retrieved from internet, published at least as early as Feb. 21, 2020 (1 page).
China Agricultural Self-Propelled Sprayer, image retrieved from internet, published at least as early as Feb. 21, 2020 (1 page).
Gaber Distributors, Pommier Spray Booms, Feb. 25, 2020, available at www.gaberdistributors.com/page/pommier (3 pages).
Hardi Rubicon 9000, image retrieved from internet, published at least as early as Feb. 21, 2020 (1 page).
Househam Spirit, image retrieved from alibaba.com with no model info, published at least as early as Feb. 21, 2020 (1 page).
New Holland Guardian SP310F, image retrieved from internet, published at least as early as Feb. 21, 2020 (1 page).
2018 New Holland Agriculture Guardian Rear Boom Sprayer—Tier 4B SP.300C, image retrieved from internet, published at least as early as Feb. 21, 2020 (1 page).
Pommier-America, Hydraulic Breakaway Kit & Last Section, image of webpage, published at least as early as Nov. 5, 2019, available at www.pommier-america.com/en/produit/hydraulic-breakaway-kit-last-section-31.html (1 page).

* cited by examiner

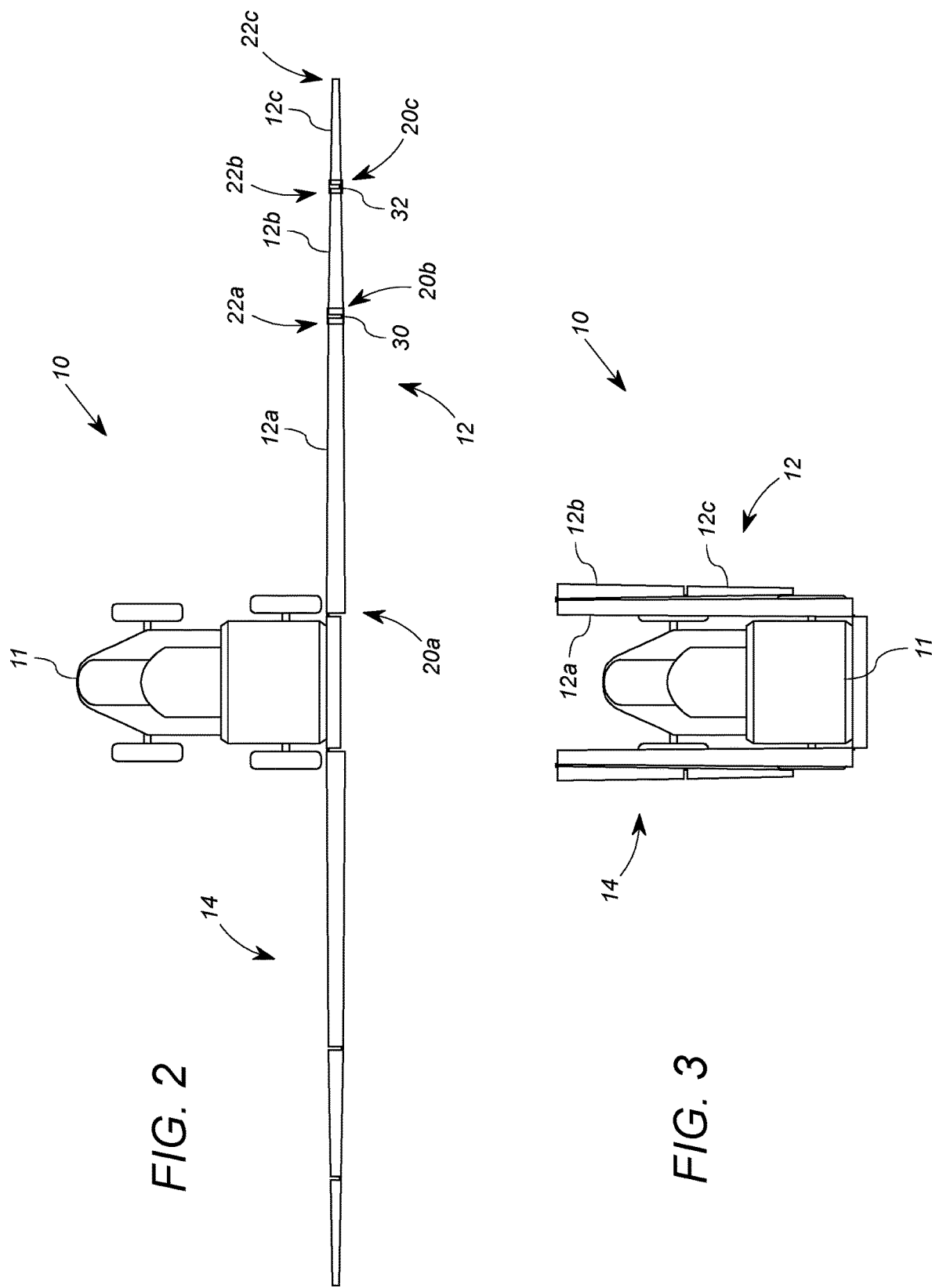

MULTI-BREAKAWAY BOOM FOR AGRICULTURAL MACHINE

BACKGROUND

A crop sprayer is a piece of agricultural equipment that is used to apply herbicides, fertilizers and pesticides on agricultural crops. Crop sprayers range in size from man-portable units to trailed sprayers that are connected to a tractor, to self-propelled units. A self-propelled crop sprayer is a vehicle similar to a tractor, with booms that allow for a broad application of spray liquid. The mounted booms can be up to 30-70 feet in length depending on engineering design for tractor and land size. The booms generally extend laterally from the vehicle such that a swath of land of 60 to 140 feet may be sprayed.

In order to store self-propelled sprayers or even trailed sprayers, the booms are often designed to collapse and rotate to extend parallel to the length of the vehicle when not in use. For example, the Apache AS1240XP sprayer available from ET Works LLC of Mooresville, Ind., can be outfitted with booms of 60' in length which collapse roughly in half (via a hinged connection between two boom sections), and then rotate via another hinged connection to extend along the length of the vehicle. Such configuration of sprayer booms are ubiquitous throughout the industry.

A challenge with crop sprayers is handling uneven terrain. For example, a crop sprayer can have 100' booms that extend only a few feet off of the ground. Under these conditions, a relatively modest bump can tilt the boom sufficiently to encounter the ground at its furthest extent. Accordingly, it is not uncommon for a crop sprayer to have a trip/breakaway mechanism that allows a part of the boom to partly collapse (i.e. trip or breakaway) without permanent damage to the boom and spray equipment. The collapse usually involves rotating a portion of the boom with respect to another part of the boom. Many trip mechanisms are biased to recover once the obstacle is cleared.

It is readily apparent that larger booms are desirable because they can cover more ground with a single pass of the sprayer. However, larger booms are more susceptible to collisions of the boom due to the length. Moreover, as crop sprayer vehicles become more autonomous, the possibility of a crop sprayer hitting a standalone obstacle like a fence post increases. The currently trip mechanisms are adequate for temporarily collapsing the furthest foldable boom segment, such mechanisms do not have the capability of tripping large segments, which can be necessarily.

In some cases, the same mechanism that folds one or more boom segments for storage can be configured as a trip mechanism. However, such configurations provide extremely limited trip directions, such as around a single axis. Because encountered terrain anomalies and obstacles are unpredictable, the single axis trip motion is of limited usefulness.

Accordingly, there is a need for a method and apparatus for tripping one more segments of a crop sprayer boom that are suitable for long segments in of the boom, and which allow breakaway in directions other than merely the fold axis of the boom.

SUMMARY

At least some of the embodiments described herein address the above-stated need, as well as others, by providing trip mechanisms on multiple boom segments, wherein each trip mechanism allows movement in directions other than fold direction.

In a first embodiment, a boom for an agricultural machine includes a first boom section, a second boom section, and a third boom section. The first boom section is connectable to a vehicle, and is configured to support fluid delivery components. The second boom section operably connected to the first boom section, the second boom section foldable with respect to the first boom section about a fold axis from a first extended position to a first folded position. The second boom section is further coupled to move with respect to the first boom other than about the fold axis from the first extended position in response to an external force, and to return to the first extended position upon removal of the external force. The third boom section is operably connected to the second boom and having at least in an extended position. The third boom section is operably connected to move with respect to the second boom in response to a second external force, and operably connected to return to the extended position upon removal of the second external force.

In a second embodiment, a boom for an agricultural machine includes a first boom section, as second boom section, and a coupling frame. The first boom section is connectable to a vehicle and is configured to support fluid delivery components. The second boom section operably connected to the first boom section, the second boom section foldable with respect to the first boom section about a fold axis from an extended position to a folded position, the second boom section further coupled to move with respect to the first boom section other than about the fold axis from the extended position in response to an external force, the second boom operably coupled to return to the first extended position upon removal of the external force. The coupling frame is coupled between the first boom section and the second boom section, and is rotatably coupled on a first side to the first boom section along the fold axis. The coupling frame is further coupled to the second boom section such that the second boom section can move relative to the coupling frame.

The above-described features and advantages, as well as others, will become more readily apparent to those of ordinary skill in the art by reference to the following detailed description and accompanying drawings.

BRIEF DESCRIPTION OF THE DRAWINGS

FIG. 2 shows a top schematic view of the agricultural machine of FIG. 1 with booms in normal, extended position for use in spraying;

FIG. 3 shows a top schematic view of the agricultural machine of FIG. 1 with booms in a normal, retracted position for storage and transport;

DETAILED DESCRIPTION

Figure 1:
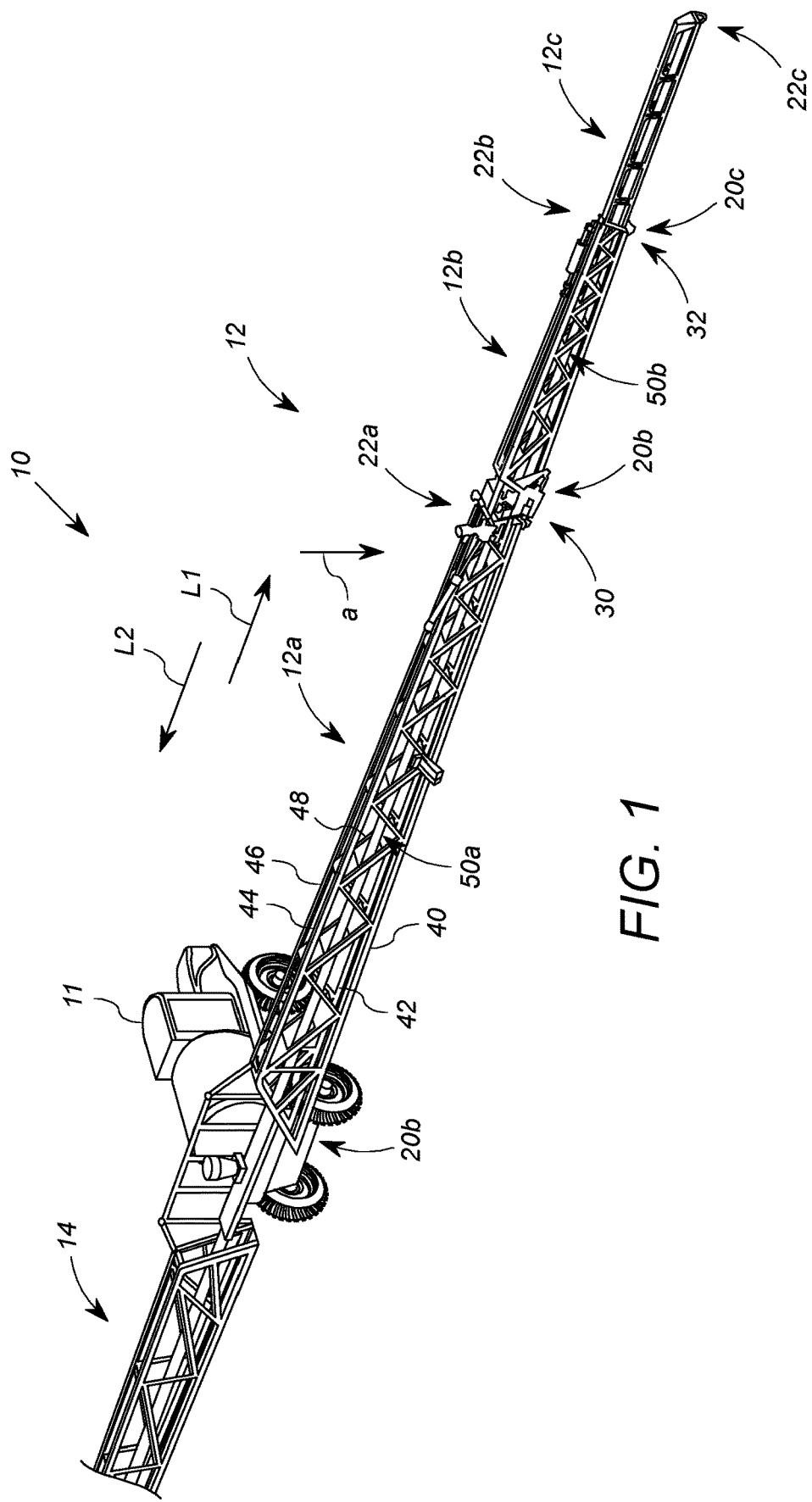
FIG. 1 shows a fragmentary perspective view of an agricultural machine incorporating a multi-breakaway arrangement according to a first embodiment herein.
Figure 5:
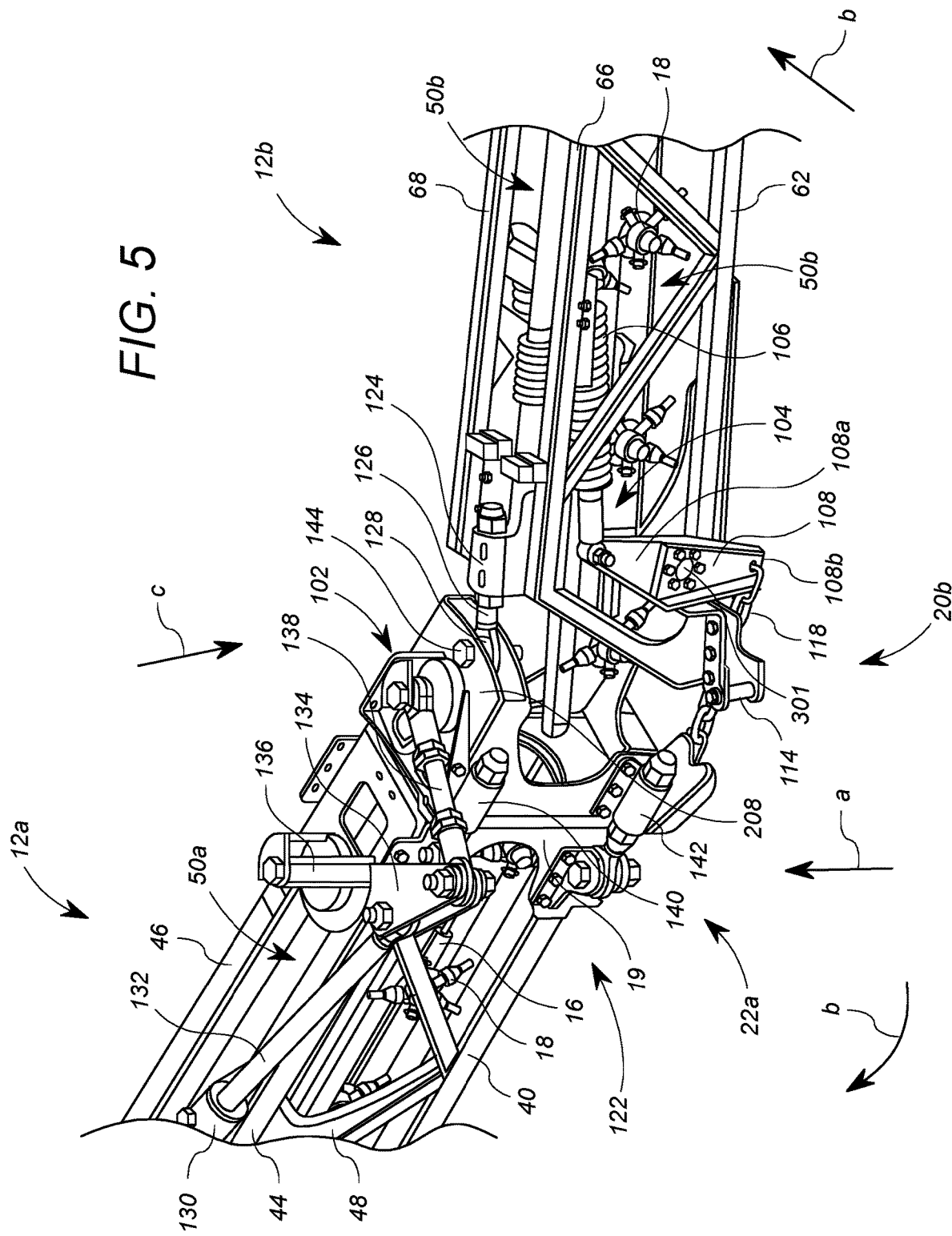
FIG. 5 shows a first fragmentary perspective view of the boom of the machine of FIG. 1 showing a first breakaway system.
Figure 6:
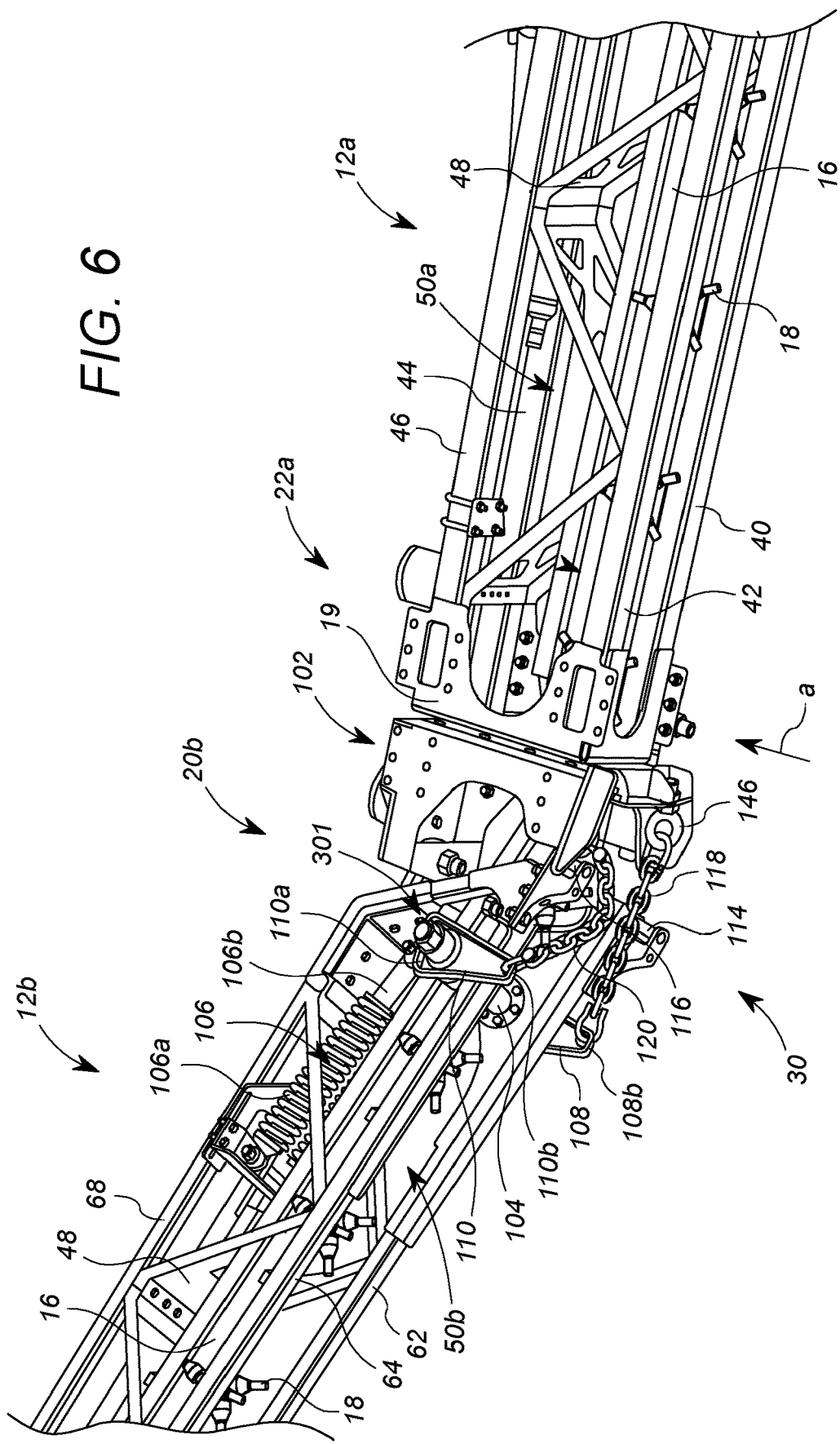
FIG. 6 shows a second fragmentary perspective view of the boom of the machine of FIG. 1 showing the first breakaway system.

FIG. 1 shows a fragmentary, perspective view of an agricultural machine 10 having a vehicle 11, a first boom 12 and a second boom 14, according to a first embodiment. The second boom 14 is shown in fragment, but has the same general structure as the first boom 12. The agricultural machine 10 is configured to spray crops with liquids. The first boom 12 is divided into three foldable boom segments 12a, 12b, and 12c. Although not shown in FIG. 1 for clarity of exposition, disposed within the first boom 12 is a plumbing conduit 16 and a plurality of downward facing spray nozzle assemblies 18 operably coupled to the plumbing conduit 16. The spray nozzles 18 are spaced apart along the plumbing conduit 16 over substantially the entire length of the first boom 12. FIGS. 5 and 6, discussed further below, show portions of the plumbing conduit 16 and spray nozzle assemblies 18. The plumbing conduit 16 is formed of multiple segments that collectively extend substantially along the entire length of the boom 12. The details of the plumbing conduit 16 and spray nozzle assemblies 18 may take any suitable form.

Referring again to FIG. 1, the booms 12 and 14 have an extended configuration or position for spraying use and a retracted or folded position for storage, as well as travel to and from the field to be sprayed. FIG. 1 shows the booms 12 and 14 in the extended position. Likewise, FIG. 2 shows a top schematic view of the agricultural machine 10 with the booms 12 and 14 in the extended position. FIG. 3, however, shows a top schematic view of the agricultural machine 10 with the booms 12 and 14 in the retracted or folded position. The retracted configuration shown in FIG. 3 makes the agricultural machine easier to store, and facilitates travel of the vehicle 11 when the machine 10 is not spraying.

The boom 12 is described in further detail with reference to FIGS. 1 to 3. It will be understood that the boom 14 the same structure in mirror image. With further reference to FIGS. 1 and 2, all three segments 12a, 12b, and 12c in the extended position extend generally perpendicular to the direction of the travel of the vehicle 11. This perpendicular direction is referred to as the lateral direction. With reference to the boom 12, the direction away from the vehicle is defined as the laterally outward direction L1, and the opposite direction is defined as the laterally inward direction L2.

The inner segment 12a has a first end 20a operably coupled to and proximate to the vehicle 11, and a second end 22a. The intermediate segment 12b has a first end 20b operably coupled to and proximate to the second end 22a of the inner segment 12a, and a second end 22b. The outer segment 12c has a first end 20c operably coupled to and proximate to the second end 22b of the intermediate segment 12b, and a second end 22c. The length from the first end 20a of the inner segment 12a to the second end 22c of the outer segment 12c in the extended configuration of FIG. 1 defines the length of the boom 12.

As shown in FIG. 3, in the retracted configuration the segments 12a, 12b, 12c extend generally alongside the vehicle 11 and generally parallel to the direction of travel. To this end, the segments 12a and 12b have pivotal connections to allow the segments 12a, 12b and 12c to fold toward the retracted position. As shown in FIG. 3, the boom 14 is similarly retracted.

With specific reference to the boom 12, the first end 20a of the segment 12a is pivotally connected to the vehicle 11 such that the boom segment can rotate about a substantially vertical fold axis from the extended configuration to the retracted configuration. The first end 20b of the intermediate segment 12b is operably pivotally connected to the second end 22a of the inner segment 12a to rotate about a substantially vertical fold axis a. The first end 20c of the outer segment 12c is operably connected to the second end 22b of the intermediate segment 12b, but is not configured to pivot to another position in the retracted position. As shown in FIGS. 1 and 2, the position of the outer segment 12c with respect to the intermediate segment 12b does not change in the extended and retracted configurations.

The vehicle 11 contains hydraulic circuitry, not shown in detail, but which can take many forms known in the art, that controllably rotates the intermediate segment 12b between the retracted and extend configuration, controllably rotates the inner segment 12a between the retracted and extended configuration, and controllably retracts and extends the boom 14 in the same manner. The hydraulic circuitry may suitably controlled by the operator of the machine 10.

Figure 4:
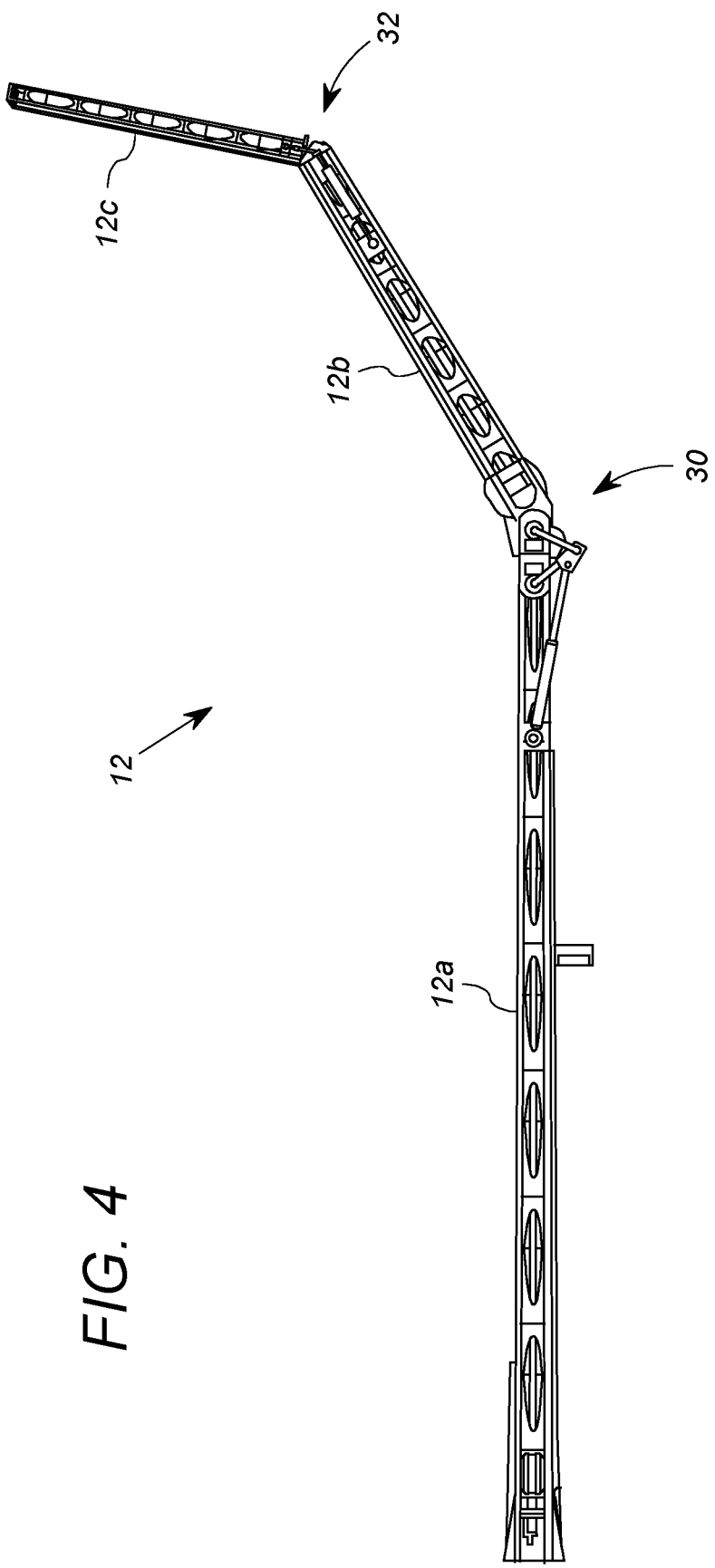
FIG. 4 shows a top plan view of a boom of the agricultural machine of FIG. 1 with multiple breakaway systems in a tripped position.

In accordance with embodiments described herein, the intermediate boom segment 12b is further operably coupled to the inner boom segment 12a via a first breakaway system 30. Similarly, the outer boom segment 12c is operably coupled to the intermediate boom segment 12b via a second breakaway system 32. Each of the breakaway systems 30, 32 is configured to independently trip (or breakaway) responsive to encountering an obstacle or a terrain feature. More specifically, the intermediate boom section 12b is further coupled via the first breakaway system 30 to move with respect to the first boom section 12a in directions other than about the fold axis a from the extended position shown in FIG. 1 in response to an external force. The intermediate boom section 12b is further operably coupled to return to the extended position upon removal of the external force. Similarly, the outer boom section 12c is operably connected via the second breakaway system 32 to move with respect to the intermediate boom section 12b in response to external force, even though it is not folded in the retracted position with respect to the intermediate boom section 12b. FIG. 4 shows a top plan view of the boom 12 wherein both the first breakaway system 30 and the second breakaway system 32 has tripped, such that the boom sections 12b and 12c are in a breakaway position.

Thus, FIGS. 1 and 2 show the boom 12 in its extended, nominal position for use in spraying fields. By contrast, FIG. 4 shows a top view of the boom 12 where in both breakaway systems 30, 32 have tripped to allow the intermediate boom section 12b and outer boom section 12c to move in different directions. With reference to FIGS. 1 and 4, in this embodiment, the inner boom section 12a includes four linear metal rails 40, 42, 44, 46 running generally the length of the section 12a. As shown more clearly in FIGS. 5 and 6, a plurality of slanted gusset plates 48 extend between the four rails 40, 42, 44 and 46. The four rails 40, 42, 44, 46 are spaced apart so as to collectively define corners of an elongated, open interior 50a in which gusset plates 48, the plumbing pipes 16 and spray nozzle assemblies 18 are disposed (See FIGS. 5, 6). The rails 40, 42, 44 and 46 gradually converge from the first end 20a that is nearest the vehicle 11 to the second end 22a adjacent the intermediate boom section 12b. The gusset plates 48 metal plates that are coupled between the bottom rails 40, 42 and the upper rails 44, 46 at alternating angles. The gusset plates 48 have interior openings through with the plumbing pipes 16 extend. However, it will be appreciated that the advantages of the breakaway techniques described here can readily be adopted to boom sections of other designs, including those have fewer rails and/or no or different gusset or support structures.

Figure 10:
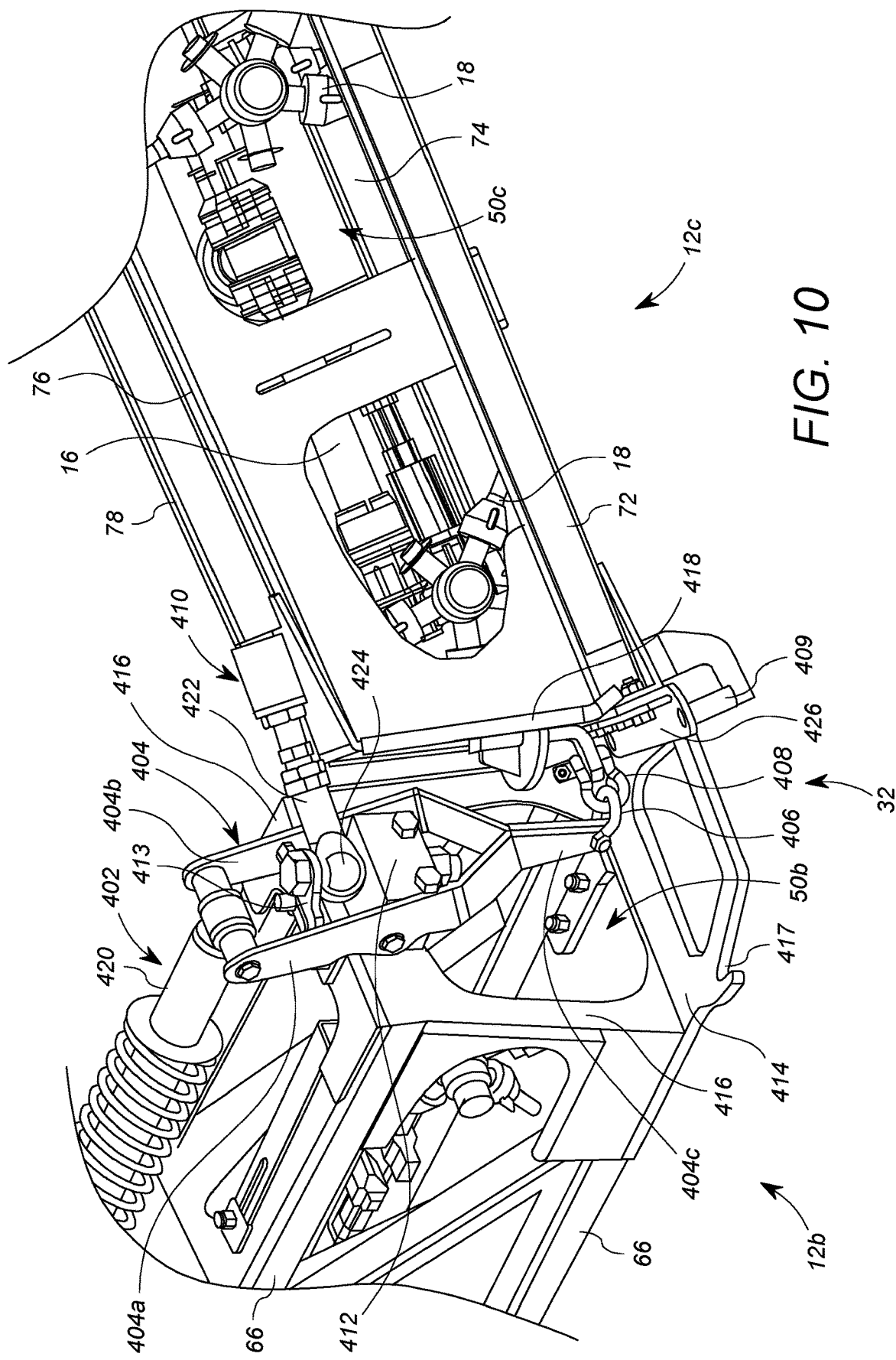
FIG. 10 shows a fragmentary perspective view of the boom of the machine of FIG. 1 showing a second breakaway system.

The intermediate boom section 12b has a similar overall structure. As better seen in FIGS. 5 and 6, discussed further below, the intermediate boom section 12b includes four rails 62, 64, 66, 68 defining an interior 50b, gusset plates 48, plumbing pipes 16 and spray nozzle assemblies 18, all constructed in a manner similar to that of the inner boom section 12a. Similarly, as best seen in FIG. 10, the outer boom section 12c includes two rails 72, 74 and an upper beam structure 76 defining an interior 50c, gusset plates 48c, plumbing pipes 16 and spray nozzle assemblies 18, all constructed in a manner similar to that of the inner boom section 12a.

The first breakaway system 30 is shown in further detail in FIGS. 5 and 6. FIGS. 5 and 6 shows two different fragmentary perspective views first breakaway system 30 in context, operably coupled to adjacent ends 22a, 20b, respectively, of the inner boom section 12a and the intermediate boom section 12b. The first breakaway system 30 includes a dual hinge frame 102, an axle brake 104, a spring and dampener system 106, first and second arms 108, 110, a tie rod 112, first and second seating pins 114, 116, and first and second chains 118, 120.

In general, the spring and dampener system 106 includes at least one spring mechanism 106a disposed about a hydraulic dampener having a linearly movable rod 106b. In some embodiments, the spring and dampener system 106 includes two springs disposed about two hydraulic dampeners, arranged in parallel. The system 106 is mounted to intermediate boom section 12b such that the rod 106b moves generally along the boom length direction. Movement of the rod 106b in the direction away from the end 20b compresses the spring 106a, and the spring 106a resists such movement, and the hydraulic dampener operates as is known in the art to dampen return force of the spring 106a after compression.

The first and second arms 108, 110 are rotatably secured to the intermediate boom structure 12b via the axle brake 104. The axle brake 104 includes rotating axle 301, which is discussed further below in connection with FIG. 8. In general, the rotating axle 301 extends horizontally across the width of the intermediate boom section 12b. The first arm 108 is rotatably coupled to the intermediate boom section 12b via the axle 301, and is disposed external to the interior 50 adjacent to rails 62, 66. Similarly, and the second arm 110 is rotatably coupled to the intermediate beam section 12b via the axle 301, and is disposed external to the interior 50 on the opposite side, adjacent to rails 64, 68.

The first arm 108 has a first end 108a and a second end 108b that rotate about an intermediate axis defined by the axle brake 104. The first end 108a is coupled to the rod 106b of the spring and dampener system 106, and the second end 108b is coupled to the first chain 118. Similarly, the second arm 110 has a first end 110a and a second end 110b that rotate about an intermediate axis defined by the axle brake 104. The first end 110a is coupled to the rod 106b of the spring and dampener system 106, and the second end 110b is coupled to the second chain 120. As coupled the spring 106a of the system 106 biases the first ends 110a, 108a in the direction of the dual hinged frame 102.

In general, the dual hinge frame 102 is a structure that enables the intermediate boom structure 12b to rotate about fold axis a for normal folding operation, resulting in the configuration of FIG. 3, and also for a multidirectional breakaway action described herebelow. To this end, the dual hinge frame 102 is operably coupled to rotate about the fold axis a with respect to the inner boom structure 12a, and the intermediate boom structure 12b is operably coupled (via parts of the breakaway system 30) to rotate or move in multiple directions with respect to the dual hinge frame 102. In other words, normal folding operations involve rotating the dual hinge frame 102, which under normal circumstances, is coupled to the intermediate boom structure 12b in a fixed manner, so that the dual hinge frame 102, the intermediate boom structure 12b and the outer boom structure 12c all rotate as a group with respect to the inner boom section 12a. (Compare FIGS. 2 and 3). When the boom is in extended position (see FIGS. 1 and 2), the dual hinged frame 102 is fixed in position with respect to the inner boom section 12a. If the intermediate boom section 12b encounters an obstacle and must breakaway, the intermediate boom section 12b rotates with respect to the dual hinged frame 102, which otherwise stays in a fixed position with respect to the inner frame section 12a.

Figure 7:
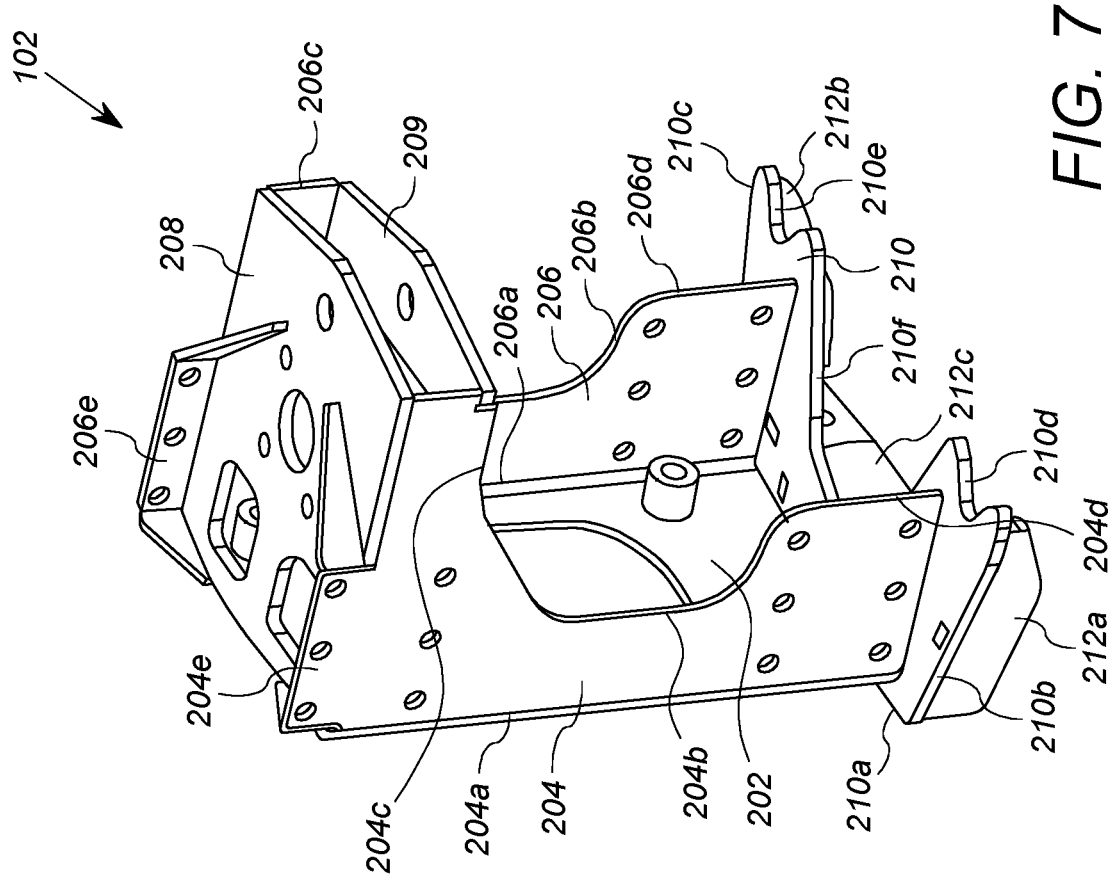
FIG. 7 shows a perspective view of a dual hinge frame of the first breakaway system of FIG. 5.

To this end, the dual hinge frame 102 is shown in perspective view in FIG. 7. The frame 102 includes a back plate 202, two c-shaped side plates 204, 206, a top plate 208, a bottom plate 210, a bottom flanges 212a, 212b, 212c, and a shelf 209. Each of the c-shaped plates 204, 206 has a corresponding straight back edge 204a, 206a that is secured to and against the back plate 202. The c-shaped plates 204, 206 are secured adjacent to opposite vertical edges of the back plate 202 and extend the vertical length of the back plate 202. In this embodiment, the back plate 202 and the c-shaped plates 204, 206 are formed as a continuous piece of sheet metal. The front edges of c-shaped plates 204, 206 include respective intermediate cutout portions 204b, 206b, which are disposed between respective upper vertical edges 204c, 206c and lower vertical edges 204d, 206d. The bottom edges of the c-shaped plates are affixed to the top surface of the bottom plate 210.

The top plate 208 generally extends between the top edges of the c-shape plates 204, 206 and the back plate 202. However, each of the c-shaped plates 204, 206 further includes an upward extending flange 204e, 206e that extends upward past the top plate 208 for a short distance. The flanges 204e, 206e extend from corresponding rear edges 204a, 206a to less than half the distance to the upper vertical edges 204c, 206c.

The shelf 209 is a plate that extends parallel to and below the top plate 208. The shelf 209 extends between the lowest points of the upper vertical edges 204c, 206c, with a front edge that extends essentially coextensive with the front edge of the top plate 208. The shelf 209 only extends partially back under the top plate 209, having a front to back depth of between one and three inches.

The bottom plate 210 also defines a form of a c-shape, having a back edge 210a, side edges 210b, 210c, and a front edge having components 210*d*, 210*e*, 210*f*. More specifically, the front edge includes a v-shaped notch portion forming a pin seat 210*d* adjacent the side edge 210*b*, and a similar v-shaped notched portion forming a second pin seat 210*e* adjacent the side edge 210*c*. Between the two pin seats 210*d*, 210*e* extends a concave curved intermediate front edge 210*f*. The bottom of the side plate 204 is coupled to the top plate 210 between the back plate 210*a*, the pin seat 210*d*, the intermediate front edge 210*f* and the side edge 201*b*. The bottom of the side plate 206 is coupled to the top plate 210 between the back plate 210*a*, the pin seat 210*e*, the intermediate front edge 210*f* and the side edge 201*c*. The bottom flanges 212*a*, 212*b*, 212*c* extend downward from the bottom of the bottom plate 210 along the side edge 210*b*, the back edge 210*a*, and the side edge 210*c*, respectively. The bottom flange 212*c* extends between the flanges 212*a* and 212*b*.

Some or all of the couplings between the plates 202, 204, 206, 208, 210, shelf 209, and flanges 212*a*, 212*b*, 212*c* may suitably be welds. As discussed above, the plates 202, 204, 206 in this embodiment are formed of a continuous piece of sheet metal.

Referring again to FIGS. 5 and 6, with contemporaneous reference to FIG. 7, in the extended (spray) position, the back plate 210 of the dual hinge frame 102 abuts an end plate 19 affixed to the end 22*a* of the inner boom section 12*a*. In the retracted position, not shown in FIGS. 5 and 6 (but see FIG. 3), the dual hinge 102 is rotated approximately 180 degrees about the fold axis a such that the side plate 204 of the dual hinge 102 is disposed adjacent to and along the rails 40, 44, of the inner boom section 12*a*. The dual hinge frame 102 is coupled to the inner boom section 12*a* via the folding mechanism 122. In general, the folding mechanism 122 is operably coupled and configured to rotate the dual hinge frame 102 about the fold axis in the manner discussed above.

As best shown in FIG. 5, the folding mechanism 122 includes a hydraulic cylinder 130 having a retractable rod 132, a connector plate 134, a pivot arm 136, a pivot linkage 138, and first and second hinge arms 140, 142. The hydraulic cylinder 130 is pivotably connected to the top of the inner boom section 12*a*, and the retractable piston 132 is pivotably connected to the connector plate 134. The pivot arm 136 is also axially connected to the top of the inner boom section 12*a*, and is rigidly connected to the connector plate 134. The pivot linkage 138 is pivotably connected to the top plate 208 of the dual hinge frame 102, and is also pivotably connected to the connector plate 134. The first hinge arm 140 is pivotably connected to the inner boom section 12*a* adjacent rail 44, and is rigidly coupled to the upper part of the c-shaped plate 204, at least in part to the flange 204*e*. The second hinge arm 142 is pivotably connected to the inner boom section 12*a* adjacent rail 40, and is rigidly coupled to the lower part of the c-shaped plate 204. The pivotal connections of the hinge arms 140, 142 have a common axis that defines the fold axis a.

To rotate the dual hinge plate 102 (and thus boom sections 12*b* and 12*c*) to the retracted position shown in FIG. 3, the hydraulic cylinder 130 retracts the piston 132, which pulls the connector plate 134 rearward. The connector plate 134 moves arcuately about the axis of the pivot arm 136, pulling with it the pivot linkage 138. The pulling of the pivot linkage 138 causes the rotation of the dual hinge plate 102 about the pivotal connections of the hinge arms 140, 142. The action of the pivot linkage 138 and connector plate 134 effectively translate the linear motion of the piston 132 to the pivotal movement of the dual hinge frame 102 about the fold axis a. Rotating the dual hinge frame 102 (and thus boom sections 12*b* and 12*c*) back to the extended position shown FIG. 1 (and FIGS. 5 and 6), the hydraulic cylinder 130 extends the piston 132 and the opposite operation occurs.

As discussed above, the dual hinge frame 102 is operably coupled to allow independent movement of the intermediate boom section 12*b* about multiple axes and directions other than the fold axis a. In FIGS. 5 and 6, the intermediate boom section 12*b* is shown broken away in a direction that is (in part) away from the direction of the fold movement of the section 12*b*, i.e., away from the hinge arms 140, 142, which remain in the extended position.

The general breakaway motion of the intermediate boom section 12*b* is facilitated by the chains 118, 120, the arms 108, 110, the tie rod 112, and the seating pins 114, 116. The axle brake 104 and spring and dampener system 106 are operably coupled to resist the breakaway motion under normal operation, and thus operate to prevent tripping the mechanism 30 due to moment arm forces that are natural to the travel and turning of the machine 10.

To this end, the intermediate boom section 12*b* is coupled to the dual hinged frame 102 via the tie rod 112, the first chain 118 and the second chain 120. The tie rod 112 includes a shaft 126 and a ball and socket joint 128. The shaft 126 is secured to the intermediate boom section 12*b* by an anchor sleeve 124. The anchor sleeve 124 is secured between the two upper rails 66 and 68. The ball and socket joint 128 is rotatably secured between the top plate 208 and shelf 209 of the dual hinge frame 102. To this end, a bolt/pin 144 is secured to the top plate 208 and shelf 209, extending through an opening the in the top plate 208, through the ball and socket joint 128, and an opening through the shelf 209.

As discussed above, the chains 118 and 120 are coupled to respective second ends 108*b*, 110*b* of arms 108, 110. The first and second chains 118 and 120 are also coupled to opposite sides of the dual hinged frame 102 below the bottom plate 210. For example, the first chain 118 is coupled to an eye-bolt anchor 146 that is secured to the bottom flange 212*c*. The second chain 120 is coupled in a similar manner.

In general, in the non-tripped extended position (e.g. FIGS. 1, 2), a three-point connection is established between the intermediate boom section 12*b* and the dual hinge frame 102. The ball and socket joint 128 forms a first point. The first seating pin 114 sits within the pin seat 210*d* (see FIG. 7) as the second point, and the second seating pin 116 sits with the pin seat 210*e* (see FIG. 7) as the third point. To this end, the first seating pin 114 is secured to and disposed just beyond the end of the rail 62, and the second seating pin 116 is secured to and disposed just beyond the end of the rail 64. The weight of the intermediate boom section 12*b* (and outer boom section 12*c*) holds the seating pins 114, 116 within the pin seats 210*d*, 210*e*, as the intermediate boom section 12*b* is urged to rotate downward to and toward the inner boom section 12*a* by operation of the ball and socket joint 128. In the non-breakaway extended position, the chains 118, 120 are taught do to force from the spring and damper system 106 and brake system 104.

FIGS. 5 and 6 show the intermediate boom section 12*b* in an exemplary one of a plurality of possible breakaway positions. This breakaway position of FIGS. 5 and 6 is not in the fold direction along the fold axis a, but rather in the opposite direction and inclined, about an axis defined by the ball and socket joint 128 and the seating pin 116.

To this end, upon encountering an exemplary force against the rail 62 that is at an upward angle and opposite the fold direction in a direction b, the pin 114 can move from the pin seat 210*d*, while the pin 116 and pin seat 210*e* stay engaged. The ball and socket joint 128 itself allows movement in multiple directions about its spherical axis. As a result, the movement in this example is about a linear axis c defined between the pin 116 (engaged in the seat 210e) and the ball and socket joint 128. When the obstacle is cleared, gravity, as well as the spring and damper system 106 (and to some extent the axle brake 104) causes the reverse movement about the axis c until the pin 114 reseats within the seat 210d. During the breakaway and recovery actions, the dual hinge frame 102b does not rotate with respect to the inner frame 12a, as discussed above.

It will be appreciated that encountering an obstacle from a different direction can cause breakaway rotation about a different axis defined between the pin 114 (within the seat 210d) and the ball and socket joint 128. In some cases, certain obstacle encounters can cause rotation about the spherical axis of the ball and socket joint 128 alone, such as when a vertically upward force can cause both pins 114 and 116 to rotate upward out of their respective seats 210d, 210e.

In accordance with at least some embodiments of the invention, the axle brake 104 and spring and dampener system 106 provide multi-stage, non-linear resistance to the breakaway movement in any of the plurality of directions. To this end, it will be appreciated, that when the breakaway movement shown in FIGS. 5 and 6 occur, and the pin 114 moves out of the seat 210d, the chain 118 tightens and pulls at the second end 108b of the arm 108. As a result, further movement of the pin 114 away from the dual hinge frame 102 causes the second end 108b to rotate toward the end of the intermediate boom section 12b because the chain 118 does not let the second end 108b move with the pin 114. The rotation of the arm 108 (clockwise in FIG. 5) causes the axle 301 and arm 110 to rotate the same direction.

As will be discussed further below in detail, the axle brake 104 resists this rotation of the axle 301 (and hence arm 108) with a first braking action. Such braking action prevents various non-obstacle forces from unnecessarily tripping the breakaway system 30. For example, the moment arm forces of the boom sections 12b, 12c resulting from a turn or acceleration of the vehicle 11 could cause the breakaway movement described above, absent the braking action. The axle brake 104 provides such resistance through the initial part of rotation. After the initial part of the rotation, the axle brake 104 in this embodiment provides no further resistance. At that point, further rotation of the arm 108 (and arm 110) is resistance by the spring and dampener system 106. As will be discussed below in detail, the axle brake 104 requires greater force to overcome than the spring and dampener system 106. This creates an advantageous effect whereby the resistance after the initial breakaway is reduced to allow for a smoother breakaway movement after the higher force threshold allowing the breakaway to start has been overcome.

Figure 8:
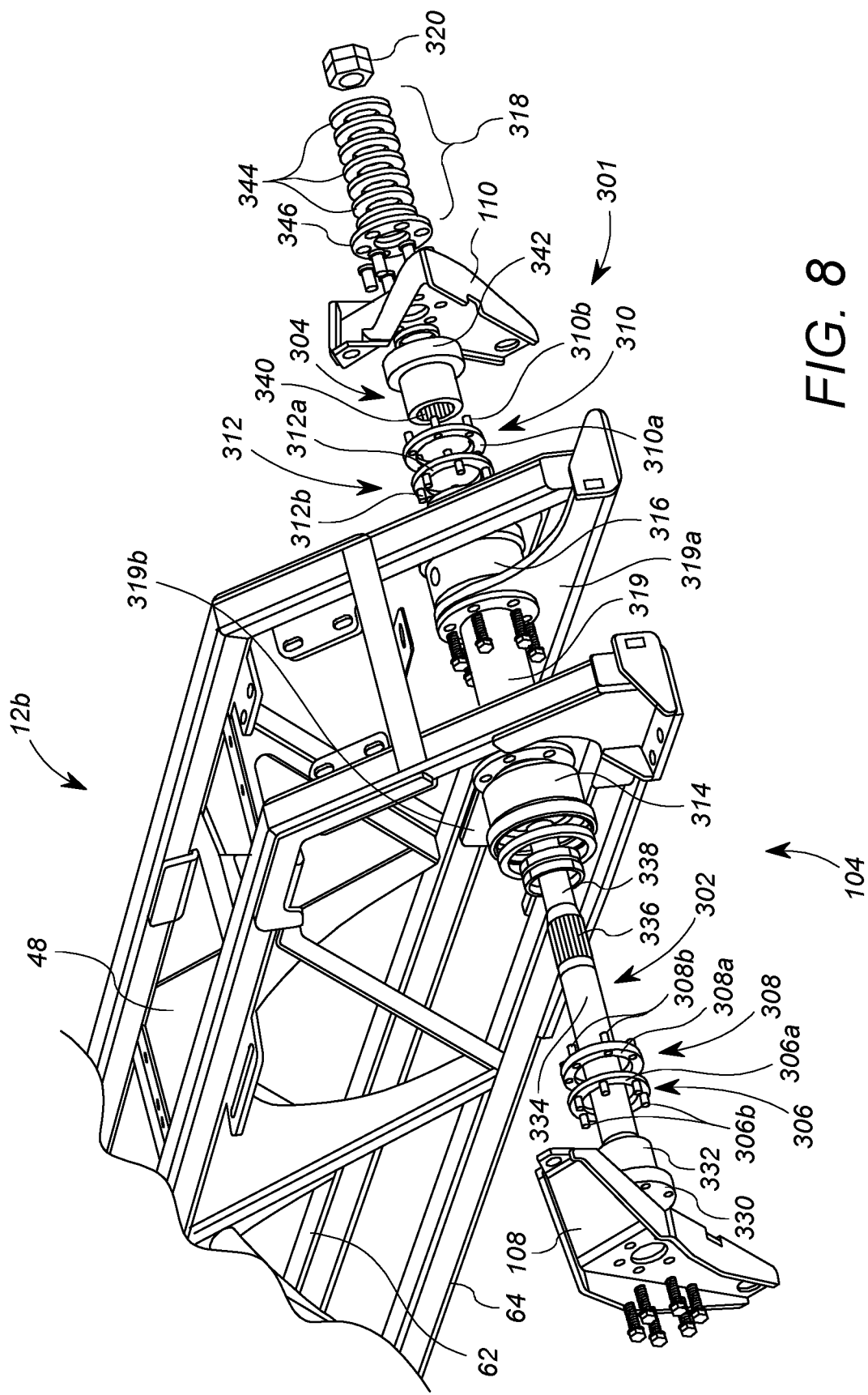
FIG. 8 shows an exploded perspective view of the axle break of the first breakaway system of FIG. 5 in context with other elements thereof and elements of the boom.

The axle brake 104 is shown in further detail in FIG. 8. FIG. 8 shows an exploded view of the axle break 104 and the arms 108, 110 mounted on the intermediate boom section 12b. Only the rails 62, 64, 66, 68 and gusset plates 48 of the intermediate boom section 12b are shown for clarity of exposition. The axle brake 104 includes a sliding axle shaft 302, an axle collar 304, a first bearing 306, a second bearing 308, a third bearing 310, a fourth bearing 312, boom bearing mounts 314, 316, a spring element 318, a sleeve 319 and an end nut 320. The sleeve 319 is a hollow metal tube that is secured to rails 62 and 64 by corresponding brackets 319a, 319b. The sleeve 319 extends axially from the bracket 319a above the rail 62 to the bracket 319b above the rail 64.

The sliding axle shaft and 302 and the axle collar 304 collectively define the axle 301 upon which the arms 108, 110 rotate. The axle shaft 302 includes a cylindrical bar defining a shaft axis. In this embodiment, that axle shaft has an end flange 330, an end shoulder 332, a main shaft 334, a splined shaft 336 and an end shaft 338. The end flange 330 is coupled securely the first arm 108. The end shoulder 332 extends between the end flange 330 and the main shaft 334. The main shaft 334 extends through the bearing mount 314, laterally through the interior 50b of the intermediate boom section 12b, and out through the bearing mount 316. The splined shaft 336 has the same general shape as the main shaft 334, but includes a plurality of axial splines on the outer surface thereof. The splined shaft 336 extends from the main shaft 334 into the axle collar 304 which has corresponding interior splines 340. Accordingly, the axle collar 304 and sliding axle shaft 302 rotate together, but are capable of relative axial movement with respect to each other.

The axle collar 304 also includes an end flange 342 that is secured to the second arm 110. The end shaft 338 extends axially from the splined shaft 336, and need not include splines. The spring element 318, which this embodiment is a plurality of spring washers 344 extend around the end shaft 338. The end nut 320 is secured to the end of the end shaft 338, trapping the spring washers 344 between the end nut 320 and the exterior of the second arm 110. In this embodiment, an additional flanged disk 346 is disposed about the sliding shaft 302 between the washers 344 and the second arm 110.

The first bearing 306 includes a disk 306a and a plurality of dowels 306b extending axially from one side of the disk 306a. On the other side of the disk 306a is locate a bearing race, which is discussed below in connection with FIGS. 9A-9C. The dowels 306b extend into corresponding holes, not shown, in the end flange 330 to secure the first bearing 306 to the sliding axle shaft 302. The second bearing 308 also includes a disk 308a, corresponding in shape and size to the disk 306a. The second bearing 308 similarly includes a plurality of dowels 308b extending axially from one side of the disk 308a. The other side of the disk 308a includes a bearing race, not shown, which is discussed below in connection with FIGS. 9A-9C. The dowels 308b of the second bearing extend into corresponding holes, not shown, in the boom bearing mount 314 to secure the second bearing 308 to the intermediate boom section 12b.

In a similar manner, the third bearing 310 includes a disk 310a and a plurality of dowels 310b extending axially from one side of the disk 310a. On the other side of the disk 310a is located a bearing race, which is discussed below in connection with FIGS. 9A-9C. The dowels 310b extend into corresponding holes, not shown, in the axle collar 304 to secure the third bearing 310 to the axle collar 304. Thus, the first bearing 306 and the third bearing 310 rotate with the axle 301. The fourth bearing 312 also includes a disk 312a, corresponding in shape and size to the disk 310a. The fourth bearing 312 also includes a plurality of dowels 312b extending axially from one side of the disk 312a. The other side of the disk 312a includes a bearing race, not shown, which is discussed below in connection with FIGS. 9A-9C. The dowels 312b of the fourth bearing 312 extend into corresponding holes, not shown, in the boom bearing mount 316 to secure the fourth bearing 312 to the intermediate boom section 12b.

Figure 9A:
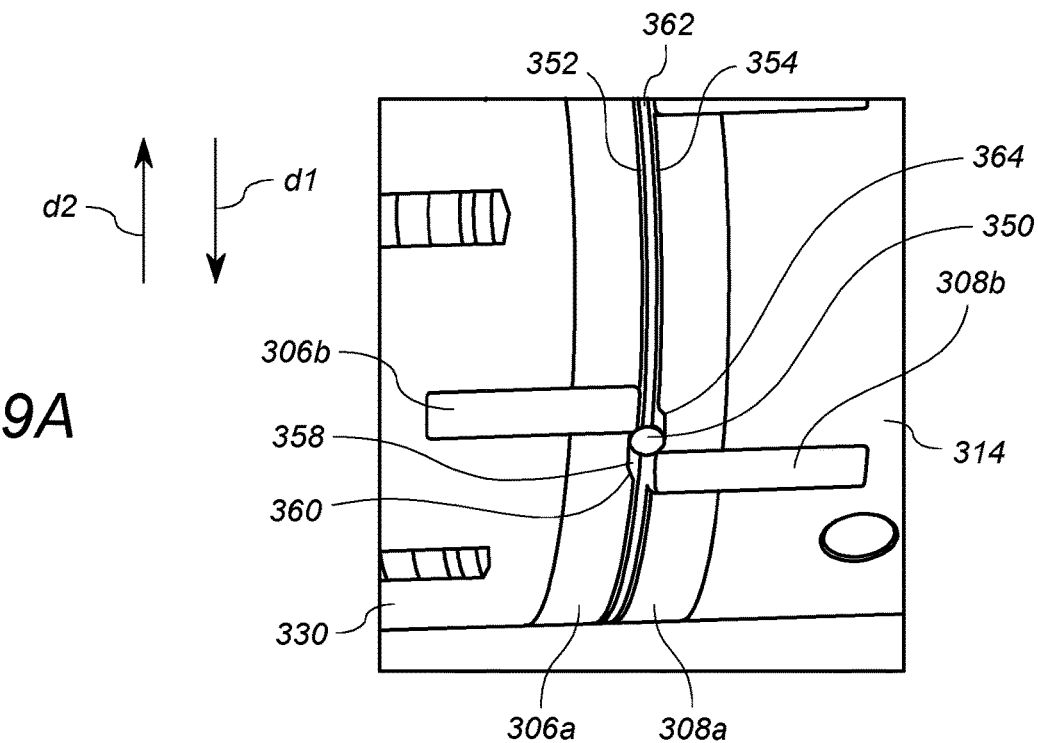
FIG. 9A shows a fragmentary circumferential cutaway of two bearings of the first breakaway system of FIG. 5 in context with other elements thereof.
Figure 9B:
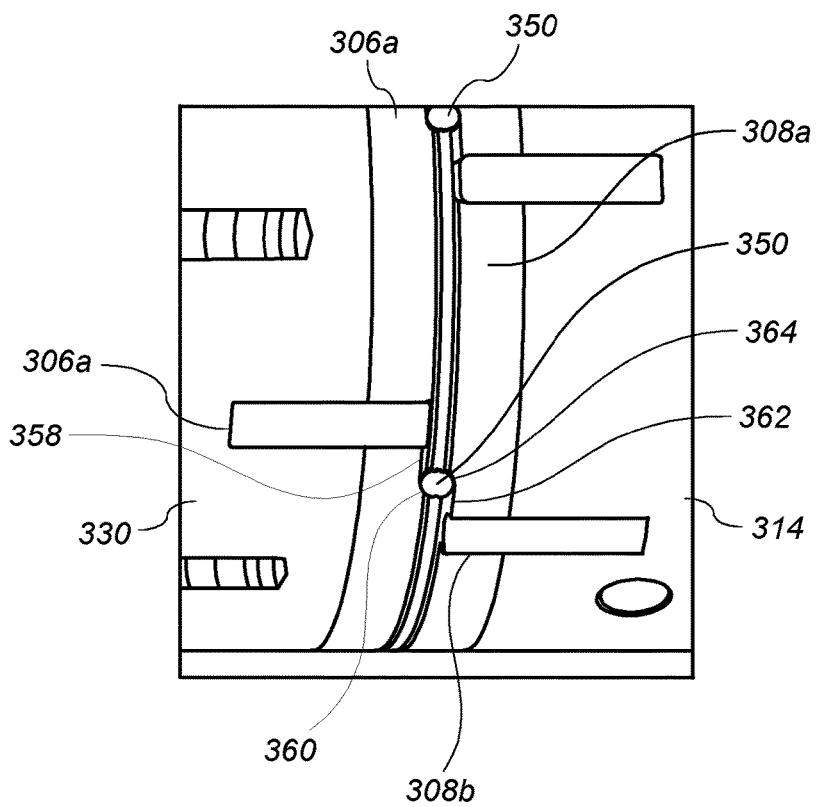
FIG. 9B shows a fragmentary circumferential cutaway of two bearings of the first breakaway system of FIG. 5 in context with other elements thereof in a second position.
Figure 9C:
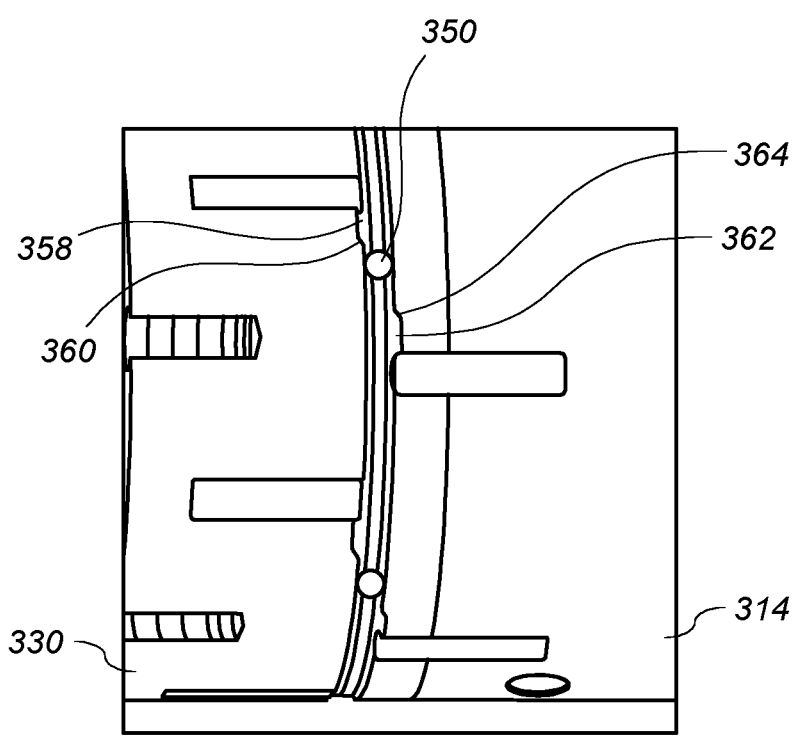
FIG. 9C shows a fragmentary circumferential cutaway of two bearing of the first breakaway system of FIG. 5 in context with other elements thereof.

FIGS. 9A-9C illustrate how the bearings 306, 308, 310 and 312 contribute to the braking action of the axle brake 304. Each of FIGS. 9A, 9B and 9C show a circumferential cross section of the first bearing 306 and second bearing 308, in connects with the end flange 330 and bearing mount 314. The circumferential cross section follows the path of the traces of the bearings 306, 308. It will be appreciated that the structure and operation of the third and fourth bearings 310, 312 are analogous to those of the first bearing 306 and the second bearing 308, discussed below.

FIG. 9A shows the bearings 306, 308 in the first position, which corresponds to the normal operation of the boom 12, wherein no breakaway movement has occurred. As shown in FIG. 9A, a ball bearing 350 is within opposing races or grooves 352, 354 in the respective bearing plates 306a, 308a. In general, the groove 352 is an axially facing, annular groove having a nominal depth through a main part, and further includes a trough 358 having an increased depth. The trough 358 has an annular length that is relatively short, spanning the range of about 10 degrees of the entire circumference of the groove 352. The trough 358 is bordered on one side by one of the dowels 306b, and on the other by a transition race 360 that slopes from the trough 358 to the nominal depth of the groove 352.

Similarly, the groove 354 is an axially facing annular groove having a nominal depth through a main part, and further includes a trough 362 having an increased depth. The groove 354 aligns with and disposed opposite of the groove 352, so that collectively the grooves 352 and 354 form confined annular track for the ball bearing 350. Similar to the trough 358, the trough 362 has an annular length that is relatively short, spanning the range of about 10 degrees of the entire circumference of the groove 354. The trough 362 is bordered on one side by one of the dowels 308b, and on the other by a transition race 364 that slopes from the trough 362 to the nominal depth of the groove 354.

In the first position, show in FIG. 9A, the ball bearing 350 is disposed within both troughs 358, 362. As will be discussed below, under normal (untripped or non-breakaway) operation, there is bias in a first direction d1 on the bearing place 306 due to the arms 108, 110 being biased by the spring and dampener system 106 (see FIGS. 5, 6 and 8). However, the dowels 306b, 308b arrest any relative movement of the ball bearing 350 beyond the position shown FIG. 9A.

FIG. 9B shows the position of the ball bearing 350 and bearings 306, 308 after initial movement of the axle 301 due to the boom section 12b encountering an obstruction. To this end, as discussed above in connection with FIGS. 5 and 6, when the boom section 12b encounters an obstruction, the boom section 12b will pivot about the ball and socket joint 128 (and possibly one of the pins 114, 116). As a result, one of the chains 118, 120 pulls a corresponding one of the arms 108, 110, causing rotation of the axle 301. More specifically, rotation of the first arm 108 causes rotation of the sliding axle shaft 302, which in turn (via the spline shaft 336 and interior splines 340 on the axle collar 304) causes rotation of the axle sleeve 304. In turn, the first bearing 306 will begin to rotate with respect to the second bearing 308, and the third bearing 310 will being to rotate with respect to the fourth bearing 312.

Referring again to FIG. 9B, such motion causes the first bearing 306 to move in the second direction d2, against the normal bias. In the initial parts of the rotation of the first bearing 306, the ball bearing 350 travels in the troughs 358 and 362 toward the respective transition races 360, 364. In order for the ball bearing 350 to further travel out of the troughs 358, 362 the bearings 306, 308 must axially separate by an additional amount.

Accordingly, FIG. 9C shows the ball bearing 350 after it has completely traveled out of the troughs 358 and 362 due to further rotation of the first bearing 306. As will be discussed below, the braking action of the axle brake 104 occurs when the ball bearing 350 transitions out of the troughs 358, 362.

It will be appreciated that in this embodiment, additional ball bearings are disposed about the circumference of the annular grooves 352, 354, and each is arranged with troughs similar to troughs 358 and 362 to behave in the same manner in synchronization with the ball bearing 350. It will further be appreciated that at the same time, rotation of the axle 301 causes a substantially identical action by other ball bearings, not shown, transitioning out of identical troughs in the bearings 310, 312.

Referring to FIG. 8, the axial separation of the bearings 306, 308 and the axial separation of the bearings 310, 312 tends to push the sliding axial shaft 302 in the axial direction defined from the second arm 110 to the first arm 108. As discussed above, axial movement of the sliding axle shaft 302 is facilitate by the splined shaft 336 and the internal splines 340 of the axle collar 304. Because the bearing 308 is fixed, the axial separation of the bearings 306, 308 is achieved by outward movement of the bearing 306, and hence the sliding axle shaft 302. Likewise, because the bearing 312 is fixed, the axial separation of the bearings 310, 312 is achieved by axially outward movement (in the opposite direction) of the axle sleeve 304.

As the sliding axial shaft 302 moves one axial direction and the axle collar 304 moves the other axial direction, the end nut 320 (which moves with sliding axial shaft 302) and the axle collar 304 are pulled toward each other, compressing the spring element 318. The resistance of the spring element 318 to this compressing force is the first braking force provided by the axle brake 104. The spring element 318 resists the separation of the bearings 306, 308, and the separation of the bearings 310, 312.

Referring again to FIG. 9C, after the ball bearing 350 clears both troughs 358, 362, then no further resistance is provided by the axle brake 104 because no further axial separation between the bearings 306 and 308 (and similarly bearings 310 and 312) is required for further rotation of the axle 301.

Referring to FIGS. 5 and 6, it will be appreciated that further rotation of the arms 108, 110 (as caused by breakaway movement of the intermediate boom section 12b) is subject to a second braking force applied by the spring and dampener system 106. To this end, the first ends 108a, 110a of respective arms 108, 110 are operably coupled to the spring and dampener system 106 such that rotation of the ends 108a, 110a away from the dual hinge frame 102 is resisted by the dampening action of the spring and dampener system 106. For reasons that will be discussed below, the spring and dampener system 106 is configured such that its resistive force is less than that of the axle break 104.

Once the boom 12 clears the obstacle, the intermediate boom section 12b returns to position due to gravity and the return bias action of the spring and dampener system 106 (and to some degree the axle brake 104). In general, the spring and dampener system 106 will counter-rotate the arms 108, 110, and the axle 301 will return to its normal position. As a result, the ball bearing 350 returns to the position shown in FIG. 9A.

One benefit of this embodiment is that the axle brake 104 has a greater resistance to breakaway (tripping) than the spring and dampener system 106. This multi-action non-linear braking arrangement requires a higher amount of incremental force to initiate the breakaway, but less incremental force to move the intermediate boom section 12b further out of the way once the initial tripping of the axle brake 104 has occurred. The result is superior to a system that has only a single action brake or resistive force. To this end, if a single resistive force is too small, then merely turning or accelerating the vehicle could trip the breakaway, due to the large moment arm force created by the intermediate boom section 12b and the outer boom section 12c. If, however, the single resistive force is too large through the entire breakaway movement, then a breakaway that requires a large amount clearance could result in damage from the requirement of overcoming too much resistance. In addition, any spring or hydraulic system providing a high amount of resistance will generate a strong return force (when the obstacle is cleared) that can damage the boom 12.

It will be appreciated that both brakes may be adjusted as desired based on boom weight and other factors. The spring and dampener system 106 can be adjusted in the manner of any conventional adjustable force hydraulic dampener. The axle brake 104 can be adjusted by adding or subtracting spring washers 344, or adjusting the type of spring washer used. It will be appreciated that the spring washers 344 in other embodiments may be replaced by a helical compression spring, or other spring mechanism.

Referring again to FIGS. 3 and 4, one of the advantages of the embodiment described herein is that the outer boom 12c may also breakaway independent of the intermediate boom section 12b. As shown in FIG. 4, the outer boom 12c and intermediate boom 12b may breakaway in the same direction, resulting in an enhanced range of motion of the outer boom section 12c.

As discussed above the outer boom section 12c is operably coupled to the intermediate boom section 12b by the second breakaway system 32. FIG. 10 shows a fragmentary perspective view of the second breakaway system 32 in context at the intersection of the outer boom section 12c, which is shown in part, and the intermediate boom section 12b, which is also shown in part. The second breakaway system 32 includes a hydraulic damper 402, a yoke 404, loop couplings 406, 408, seating pins 409, a tie rod 410, a mounting block 412, a bolt bracket 413, and a bottom plate 414.

The mounting block 412 is disposed on an endplate 416 of the intermediate boom section 12b, near the top, approximately level with the end of the rails 66, 68. The bottom plate 414 is also affixed to the intermediate boom section 12b and is disposed outward of the ends of the two bottom rails 62, 64. The bottom plate 414 includes two pin seats, only one of which (pin seat 417) is visible in FIG. 10, which have a similar design and function as the pin seats 210d, 210e of the dual hinge frame 102 (FIGS. 5 and 6).

The yoke 404 includes forked arms 404a, 404b extending upward, and an opposing shaft 404c extending downward. One loop coupling 406 is affixed to the shaft 404c, the other loop coupling 408 is affixed to an endplate 418 of the outer boom section 12c. The loop couplings 406 and 408 are coupled to each other via their loops, thereby allowing relatively movement between the couplings 406, 408 without separation. The two forked arms 404a, 404b extend around and are rotatably coupled to the mounting block 412, such that the yoke 404 rotatably moves about an axis that extends in the direction across the boom 12. The ends of the forked arms 404a, 404b are operably coupled to a piston 420 of the hydraulic damper 402.

The tie rod 410 includes a shaft 422 and a ball-and-socket joint 424. The shaft 422 is fixedly coupled to the top of the outer boom section 12c, and the ball-and-socket joint 424 is operably coupled by a pin or bolt running through the bracket 413 and the mounting block 412. The system 32 has two seating pins, of which only seating pin 409 is visible in FIG. 10. The pin 409 is supported on a bracket 426 affixed to the bottom of the outer boom section 12c. The other pin is also seated on the bracket 426. The seating pin 409 is disposed near and below the end of the rail 72, and is configured to be received by the pin seat 417 in the normal non-tripped position. Similarly, the other seating pin is disposed near and below the end of the rail 74, and is configured to be received by the other pin seat, not shown, in the normal non-tripped position.

In response to the outer boom section 12c encountering an obstacle, the open design of the pin seat 417 (and other pin seat) allows either or both of the pins (e.g. pin 409) to move out of the corresponding seat. In the example of FIG. 10, an obstacle, not shown, has caused movement of the outer boom section 12c such that the seating pin 409 has rotated out of the pin seat 417. Such movement causes the loop 408 to pull the loop 406, which in turn rotates the shaft 404c of the yoke 404 toward the outer boom section 12c. The ball and socket joint 424 anchors the outer boom section 12c to the intermediate boom section 12b during such movement, and allows spherical pivotal relative motion therebetween.

As the shaft 404c of the yoke 404 rotates toward the outer boom section 12c, the ends of the forked arms 404a, 404b coupled to the piston 420 rotate back toward the piston 420, thereby compressing the hydraulic damper 402. In this manner, the hydraulic damper 402 acts as the brake and resistance to breakaway, by resisting the rotation of the yoke 404.

In this embodiment, the second breakaway system 32 need not have the multi-action, non-linear feature of the breakaway system 30 because the moment arm of the outer boom section 12c is much less than the moment arm of the combination boom sections 12b and 12c.

Thus, the embodiment described herein provides a boom arrangement for agricultural equipment such as a crop sprayer that has robust breakaway capabilities with greater flexibility and range. Such a design makes longer multi-section booms more feasible and resilient.

It will be appreciated that the above described embodiments are merely illustrative, and that those of ordinary skill in the art may readily devise their own implementations and modifications that incorporate the principles of the present invention and fall within the spirit and scope thereof. For example, it will be appreciated that the chains 118, 120 can be replaced by any other flexible element, such as cable or rope, the is flexible in compression and taut in tension. It will likewise be appreciated that the spring and damper assembly 106 can be replaced by other known biasing mechanisms that may or may not include one or more springs of any design, and/or one more hydraulic dampeners or other hydraulic devices.

In addition, at least some of the advantages described herein can be achieved with the features of the breakaway system 30 in a boom that does not include a third, outer boom section. At least some of the advantages described herein can be achieved if the plumbing pipe 16 and/or spray nozzle assemblies 18 are replaced by (or enhanced by) other known and suitable fluid delivery components, such as hoses and other spray mechanisms.

What is claimed is:

1. A boom for an agricultural machine, comprising:
    a first boom section connectable to a vehicle, the first boom section configured to support fluid delivery components;
    a second boom section operably connected to the first boom section, the second boom section foldable with respect to the first boom section about a fold axis from an extended position to a folded position, the second boom section further coupled to move with respect to the first boom section other than about the fold axis from the first extended position in response to an external force, the second boom section further operably coupled to return to the extended position upon removal of the external force; and a third boom section operably connected to the second boom section and having a first position, the third boom section operably connected to move with respect to the second boom section in response to a second external force, the third boom section configured to return to the first position upon removal of the second external force.

2. The boom of claim 1, further comprising a coupling frame coupled between the first boom section and the second boom section, the coupling frame rotatably coupled on a first side to the first boom section along the fold axis, the coupled frame further coupled to the second boom section such that the second boom section can move relative to the coupling frame.

3. The boom of claim 2, further comprising a tie rod and ball joint coupled at a first end to the coupling frame and at a second end to the second boom section to allow movement of the second boom section in a plurality of directions with respect to the coupling frame.

4. The boom of claim 3, further comprising:
a spring bias mechanism having a rod, the rod having a nominal position and a plurality of other positions;
first and second flexible links, each coupled at a first end to the coupling frame;
first and second rotatable arms, coupled to respective second ends of the first and second flexible links, the first and second rotatably arms configured to rotate in a first direction responsive to movement of the second boom section from the first extended position, the first and second rotatable arms further operably coupled to move the rod away from the nominal position when rotating in the first direction.

5. The boom of claim 4, wherein the spring bias mechanism is mounted on the second boom section.

6. The boom of claim 5, wherein each of the flexible links is a length of chain, cable or rope.

7. The boom of claim 1, wherein the second boom section is operably connected to move with respect to the first boom section about multiple axes that are nonparallel to the fold axis.

8. The boom of claim 1, further comprising a tie rod and ball joint coupled at a first end to the second boom section and at a second end to the third boom section to allow movement of the third boom section in a plurality of directions with respect to the second boom section.

9. The boom of claim 1, further comprising a tie rod and ball joint operably coupled between the first boom section and the second boom section to allow movement of the second boom section in a plurality of directions with respect to the coupling frame.

10. The boom of claim 9, further comprising:
a spring bias mechanism having a rod, the rod having a nominal position and a plurality of other positions;
first and second flexible links operably coupled to the first boom section;
first and second rotatable arms, coupled to respective second ends of the first and second flexible links, the first and second rotatably arms configured to rotate in a first direction responsive to movement of the second boom section from the first extended position, the first and second rotatable arms further operably coupled to move the rod away from the nominal position when rotating in the first direction.

11. A boom for an agricultural machine, comprising:
a first boom section connectable to a vehicle, the first boom section configured to support fluid delivery components;
a second boom section operably connected to the first boom section, the second boom section foldable with respect to the first boom section about a fold axis from an extended position to a first folded position, the second boom section further coupled to move with respect to the first boom section other than about the fold axis from the extended position in response to an external force, the second boom section operably coupled to return to the first extended position upon removal of the external force;
a coupling frame coupled between the first boom section and the second boom section, the coupling frame rotatably coupled on a first side to the first boom section along the fold axis, the coupled frame further coupled to the second boom section such that the second boom section can move relative to the coupling frame; and
a third boom section operably connected to the second boom section.

12. A boom for an agricultural machine, comprising:
a first boom section connectable to a vehicle, the first boom section configured to support fluid delivery components;
a second boom section operably connected to the first boom section, the second boom section foldable with respect to the first boom section about a fold axis from an extended position to a first folded position, the second boom section further coupled to move with respect to the first boom section other than about the fold axis from the extended position in response to an external force, the second boom section operably coupled to return to the first extended position upon removal of the external force;
a coupling frame coupled between the first boom section and the second boom section, the coupling frame rotatably coupled on a first side to the first boom section along the fold axis, the coupled frame further coupled to the second boom section such that the second boom section can move relative to the coupling frame; and
a tie rod and ball joint coupled at a first end to the coupling frame and at a second end to the second boom section to allow movement of the second boom section in a plurality of directions with respect to the coupling frame.

13. The boom of claim 12, wherein:
one of the coupling frame and the second boom section includes a first pin and the other of the coupling frame and the second boom section includes a first seat receiving the first pin when the second boom section is in the first extended position;
one of the coupling frame and the second boom section includes a second pin and the other of the coupling frame and the second boom section includes a second seat receiving the second pin when the second boom section is in the first extended position; and
wherein at least one of the first pin and the second pin moves out of the respective first seat and second seat when the second boom section moves with respect to the first boom from the first extended position in response to the external force.

14. The boom of claim 13, further comprising a bias mechanism operably coupled to urge the first pin toward and into the first seat and the second pin toward and into the second seat.

15. The boom of claim 14, wherein the first seat and the second seat are disposed on the coupling frame, and the first pin and second pin are disposed on the second boom section.

16. The boom of claim 13, further comprising two arms rotatably connected to the second boom section, each arm having a first end operably coupled to receive a biasing force, and a second end of each arm coupled the coupling frame by a flexible member such that the second end of each arm rotates responsive to movement of the first pin out of the first seat.

17. The boom of claim 16, wherein the first and second arms are configured such that the first end of each arm rotates against the bias force when the second end of each arm rotates responsive to movement of the first pin out of the first seat.

18. The boom of claim 17, further comprising a spring operably coupled to provide at least a portion of the bias force.

19. The boom of claim 16, wherein the flexible member comprises a chain, cable or rope.

20. The boom of claim 12, further comprising a third boom section operably connected to the second boom.

* * * * *